(12) United States Patent
Kim et al.

(10) Patent No.: US 9,094,482 B2
(45) Date of Patent: Jul. 28, 2015

(54) APPARATUS AND METHOD FOR CONTROLLING DATA TRANSMISSION/RECEPTION PATH BETWEEN SERVER AND MOBILE TERMINAL IN HETEROGENEOUS NETWORK ENVIRONMENT

(75) Inventors: Jin-Young Kim, Seoul (KR); Young-Sam Jun, Suwon-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 233 days.

(21) Appl. No.: 13/484,401

(22) Filed: May 31, 2012

(65) Prior Publication Data

US 2012/0307680 A1 Dec. 6, 2012

(30) Foreign Application Priority Data

May 31, 2011 (KR) ........................ 10-2011-0052412

(51) Int. Cl.
 *H04W 8/26* (2009.01)
 *H04W 36/14* (2009.01)
 *H04L 29/12* (2006.01)

(52) U.S. Cl.
 CPC ........ *H04L 61/6077* (2013.01); *H04L 61/2528* (2013.01); *H04W 8/26* (2013.01); *H04L 61/2553* (2013.01); *H04W 36/14* (2013.01)

(58) Field of Classification Search
 CPC .............................. H04W 18/28; H04W 16/00
 See application file for complete search history.

(56) References Cited

U.S. PATENT DOCUMENTS

| | | | |
|---|---|---|---|
| 8,462,785 B2 | 6/2013 | Woo | |
| 2002/0191562 A1* | 12/2002 | Kumaki et al. | 370/331 |
| 2006/0056420 A1 | 3/2006 | Okuda et al. | |
| 2009/0046687 A1* | 2/2009 | Woo | 370/338 |
| 2010/0091660 A1* | 4/2010 | Morita | 370/241 |
| 2010/0208731 A1* | 8/2010 | Hamada | 370/389 |

FOREIGN PATENT DOCUMENTS

| | | |
|---|---|---|
| CN | 101453768 A | 6/2009 |
| EP | 1855427 A1 | 11/2007 |
| JP | 2006-86800 A | 3/2006 |
| JP | 2010-141497 A | 6/2010 |
| KR | 10-0893059 B1 | 4/2009 |

(Continued)

OTHER PUBLICATIONS

Communication dated Oct. 24, 2012 issued by the European Patent Office in counterpart European Patent Application No. 12169469.9.

(Continued)

*Primary Examiner* — Jianye Wu
(74) *Attorney, Agent, or Firm* — Sughrue Mion, PLLC

(57) ABSTRACT

A data transmission/reception path between a server and a mobile terminal in a heterogeneous network environment is controlled by mapping at least one actual Internet protocol (IP) address available to the mobile terminal in the heterogeneous network environment to at least one virtual IP to generate a path mapping table, and determining a data transmission/reception path between the server and the mobile terminal with reference to the generated path mapping table. This virtualization of terminal actual addresses with respect to a server improves service continuity in an efficient, low cost manner, independent of the need to modify the OS kernel in various devices.

23 Claims, 5 Drawing Sheets

(56) References Cited

FOREIGN PATENT DOCUMENTS

| WO | 2004/105272 A1 | 12/2004 |
| WO | 2009152059 A1 | 12/2009 |

OTHER PUBLICATIONS

Soliman, et al., "Flow Bindings in Mobile IPv6 and NEMO Basic Support draft-ieft-mext-flow-binding-03.txt", IETF MEXT Working Group, Jul. 13, 2009, vol. mext, No. 3, pp. 1-32, XP015063459.

Zhao, et al., "Flexible Network Support for Mobility", Proceedings of ACM/IEEE Mobicom'98, Oct. 25, 1998, 12 pgs total, XP000850264.

Communication dated Aug. 13, 2013 issued by the Japanese Patent Office in counterpart Japanese Patent Application No. 2012-123454.

Communication dated Jun. 4, 2014, issued by the State Intellectual Property Office of the People's Republic of China in counterpart Chinese Application No. 201210177744.1.

\* cited by examiner

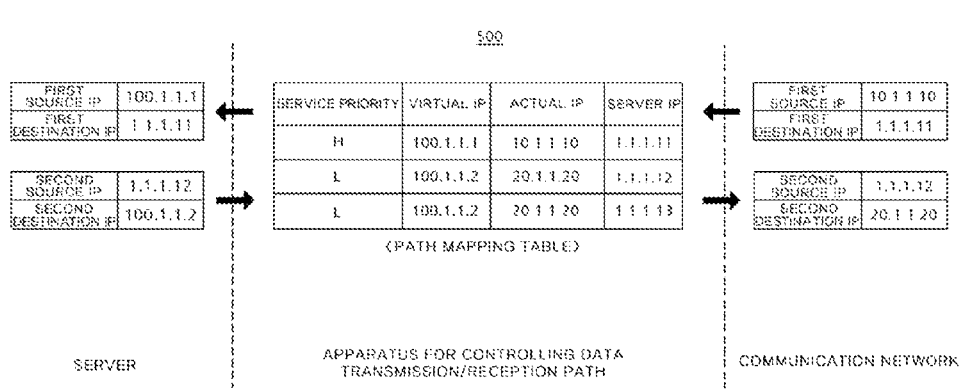

APPARATUS AND METHOD FOR CONTROLLING DATA TRANSMISSION/RECEPTION PATH BETWEEN SERVER AND MOBILE TERMINAL IN HETEROGENEOUS NETWORK ENVIRONMENT

CROSS-REFERENCE TO RELATED APPLICATION

This application claims priority from and the benefit of Republic of Korea Patent Application No. 10-2011-0052412, filed on May 31, 2011, the disclosure of which is incorporated herein by reference in its entirety.

BACKGROUND

1. Field

Apparatuses and methods consistent with exemplary embodiments relate to controlling a data transmission/reception path between a server and a mobile terminal in a heterogeneous network environment, and more particularly, to a data transmission/reception path control apparatus and method that can ensure the continuity of a service regardless of the mobility of a mobile node and support multi-homing.

2. Discussion of Related Art

Along with the development and dissemination of network technology, network environments in which different types of networks are mixed or overlap each other are increasing, and various schemes for making the best use of these network environments are being proposed. However, most existing server systems that provide service in a mobile environment operate on the basis of a single transmission/reception path and a single Internet protocol (IP) route without taking these network environments into consideration.

Also, when a network (or used IP address) to which a mobile terminal belongs varies according to movement of the mobile terminal, the mobile terminal is registered with a new network and receives a data service. At this time, the mobile terminal suffers from data loss, increase in delay time, etc. due to a change of network. Thus, a network available to a mobile terminal should be maximized in a mobile environment in which different types of networks overlap each other, and the continuity of a service should be ensured even in a situation in which network connection is cut off due to movement of the mobile terminal. In addition to these requirements, there is a need to minimize modification of an existing server system that provides a service, and also to ensure the continuity of the service and minimize delay time and data loss while reducing investment cost.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

In one or more exemplary embodiments, there is provided a transmission/reception path control apparatus and method capable of minimizing delay time and data loss, which are caused when the network environment of a mobile terminal varies, and ensuring the continuity of a service while minimizing modification of an existing server system.

According to an aspect of an exemplary embodiment, there is provided a method for an agent to control a data transmission/reception path between a server and a mobile terminal in a heterogeneous network environment, including: mapping at least one actual Internet protocol (IP) available to the mobile terminal in the heterogeneous network environment to at least one virtual IP to generate a path mapping table storing the mapping of the actual IP address to the virtual IP address; and determining a data transmission/reception path between the server and the mobile terminal with reference to the generated path mapping table.

Here, the at least one virtual IP may be assigned based on one or more services provided to the mobile terminal by the server.

The at least one virtual IP may be assigned based on one or more respective service priorities assigned to the services.

When at least some of the service priorities assigned to the services are changed, the agent may update in the path mapping table the at least one virtual IP assigned according to the services with reference to the changed priorities.

Determining the data transmission/reception path may include determining the data transmission/reception path so that an actual IP having a high path priority is assigned to a service having a high service priority.

Determining the data transmission/reception path may include replacing an actual IP included in data transmitted from the mobile terminal to the server with a virtual IP mapped to the actual IP, and transmitting the data to the server.

Determining the data transmission/reception path may include replacing a virtual IP included in data transmitted from the server to the mobile terminal with an actual IP mapped to the virtual IP, and transmitting the data to the mobile terminal.

Determining the data transmission/reception path may include, when a connection of the replaced actual IP is released, changing the actual IP whose connection is released with another actual IP, and transmitting the data to the mobile terminal.

Determining the data transmission/reception path may include, when a plurality of actual IPs are mapped to the virtual IP, replacing a virtual IP included in data transmitted from the server to the mobile terminal with the plurality of actual IPs, and multi-homing the data to the mobile terminal.

According to an aspect of another exemplary embodiment, there is provided an apparatus for controlling a data transmission/reception path between a server and a mobile terminal in a heterogeneous network environment, including: a table builder configured to build a path mapping table by mapping at least one actual IP available to the mobile terminal in the heterogeneous network environment to at least one virtual IP; and a controller configured to determine a data transmission/reception path between the server and the mobile terminal with reference to the built path mapping table.

The apparatus may further include a virtual IP assignor configured to assign the at least one virtual IP in consideration of service priorities assigned to services.

According to another exemplary embodiment, a hardware device may include a processing circuit and a non-transitory memory storing instructions that enable the processing circuit to perform operations including storing an upstream device address, storing downstream device actual addresses, and virtualizing the downstream device actual addresses, with respect to the upstream device address, in accordance with associated service priorities.

BRIEF DESCRIPTION OF THE DRAWINGS

The above and other objects, features and advantages of the inventive concept will become more apparent to those of ordinary skill in the art by describing in detail exemplary embodiments thereof with reference to the accompanying drawings, in which:

FIG. 3 shows an example of a network management table built by a table builder;

FIG. 4 shows an example of a service management table built by a table builder;

FIG. 5 shows an example of a path mapping table built by a table builder;

DETAILED DESCRIPTION OF EXEMPLARY EMBODIMENTS

The above as well as additional purposes, features, and advantages of the present invention will become apparent in the following exemplary embodiments and accompanying drawings. However, the present invention is not limited to the exemplary embodiments disclosed below, but can be implemented in various forms. These exemplary embodiments are provided so that this disclosure will be thorough and complete, and will fully convey the scope of this disclosure to those of ordinary skill in the art. As used herein, when an element is referred to as being "on" another element, it can be directly on the other element or intervening elements may be present.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, do not preclude the presence or addition of one or more other features, integers, steps, operations, elements, components, and/or groups thereof.

Hereinafter, exemplary embodiments will be described in detail below with reference to the drawings. In the following description, many details are provided so as to describe the exemplary embodiments in further detail and to aid in understanding the inventive concept. However, those of ordinary skill in the art will appreciate that the exemplary embodiments and inventive concept could be used without such details. In some cases, a description of points that are well-known will be omitted to prevent the gist of the present invention from being obscured.

Terminology used in exemplary embodiments will be described first.

Actual Internet protocol (IP): Actual network address that can be used by a mobile terminal 30 in a heterogeneous network environment Virtual IP: Virtual network address given to services that the mobile terminal 30 is provided with Server IP: Network addresses used by first to third service servers 11 to 13 according to services Service: Service provided from the first to third service servers 11 to 13 to the mobile terminal 30

Path priorities: Priorities given to actual IPs

Service priorities: Priorities given to services

Figure 1:
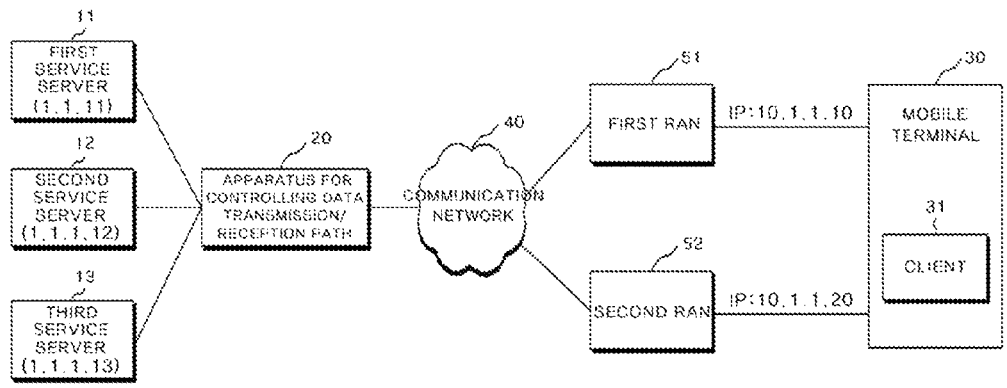
FIG. 1 is a block diagram of an example of a communication system to which an exemplary embodiment may be applied.

FIG. 1 is a block diagram of an example of a communication system to which an exemplary embodiment is applied. Referring to FIG. 1, a communication system includes first to third service servers 11 to 13, an apparatus 20 for controlling a data transmission/reception path (i.e., for controlling a communication path), and the mobile terminal 30. The apparatus 20 for controlling a data transmission/reception path may be referred to, likewise, as a path control apparatus 20.

The first to third service servers 11 to 13 provide first to third services, respectively. In the drawings, separate servers are prepared for the respective services, but the first to third service servers 11 to 13 may belong to one physical server. In such a case, a server system including the first to third service servers 11 to 13 may further include a server controller (not shown).

The server controller may control service provision of the first to third service servers 11 to 13 using virtual IP addresses provided by the path control apparatus 20. The virtual IP addresses are given by the path control apparatus 20, and will be referred to as "virtual IPs" below.

The first to third service servers 11 to 13 provide service using respective IP addresses. For example, the first service server 11 provides service using an IP address of "1.1.1.11." A server IP address, such as this, will be referred to as a "server IP" below.

The path control apparatus 20 provides service to the mobile terminal 30 having a network function. The path control apparatus 20 may provide a vertical handover solution when a connection is established or released between the mobile terminal 30 and a radio access network (RAN). Using the vertical handover solution, the path control apparatus 20 may ensure a connection with a RAN and service continuity, and may further provide a multi-homing function whereby the mobile terminal 30 can utilize all RANs available in a heterogeneous wireless access network environment for transmission and reception.

The path control apparatus 20 may be between a server system (including the first to third service servers 11 to 13) and an external network such as communication network 40. This positioning enables the path control apparatus 20 to control data received from the server system or to control all transmission/reception paths of data communicated by the mobile terminal 30 to the server system.

Alternatively, the path control apparatus 20 may be implemented as software in an existing switch, router or server system. In other words, the path control apparatus 20 may be in the form of a new function added to an existing network element. To put it another way, an exemplary embodiment may subsist in an apparatus that has a processing circuit and non-transitory memory storing instructions that enable the processing circuit to perform operations, including those operations mentioned herein. In this exemplary embodiment, it will be appreciated that the path-mapping and other tables may be stored in memory as well.

The external network may include a communication network 40, for example, the Internet, a first RAN 51, and a second RAN 52. The first RAN 51 and the second RAN 52 may provide different wireless network environments. For example, the first RAN 51 may be a wideband code division multiple access (WCDMA) network, and the second ran 52 may be a wireless fidelity (WiFi) network. Each of the first RAN 51 and the second RAN 52 may include a base station and a base station controller.

The mobile terminal 30 may be connected in a heterogeneous network arrangement including the first RAN 51 and the second RAN 52, and utilize a plurality of actual IP addresses at the same time or separately. The IP addresses are assigned through, for example, the first RAN 51 and the second RAN 52. The mobile terminal 30 may be any electronic device having a communication function, for example, a smart phone, a laptop computer, a tablet personal computer (PC) and so on. An actual IP address will be referred to as an "actual IP" below.

A client 31 which is a service module may be included in the mobile terminal 30, and may be implemented in the form of an application. The client 31 may provide a variety of services including a telephone service through the first RAN 51 or the second RAN 52, a connection service requiring security, such as a virtual private network (VPN), and so on. Via at least one of the first RAN 51 and the second RAN 52, and via the communication network 40 and the path control apparatus 20, the client 31 may request a service or may be provided with a service from at least one of the first to third service servers 11 to 13.

Figure 2:
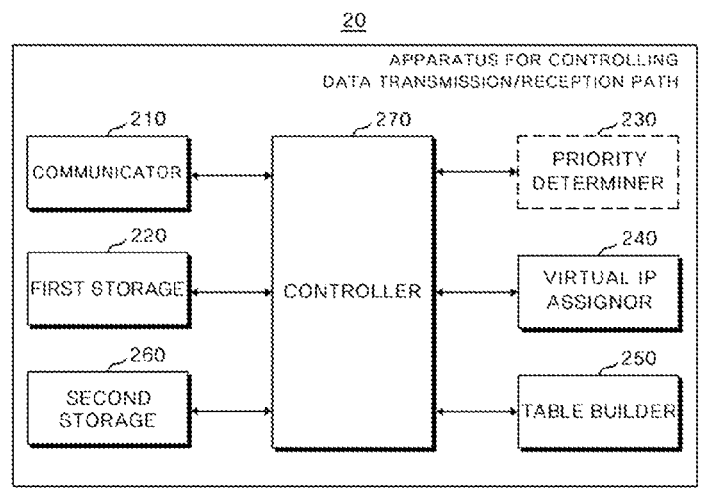
FIG. 2 is a block diagram of an apparatus for controlling a data transmission/reception path according to an exemplary embodiment.

FIG. 2 is a block diagram of the path control apparatus 20 according to an exemplary embodiment.

Referring to FIG. 2, the path control apparatus 20 includes a communicator 210, a first storage 220, a priority determiner 230, a virtual IP assignor 240, a table builder 250, a second storage 260, and a controller 270.

The communicator 210 communicates with the first to third service servers 11 to 13 and with the mobile terminal 30. For example, the communicator 210 transmits the data of a service provided by one of the first to third service servers 11 to 13 (i.e., terminal-bound data or downstream-bound data) to the mobile terminal 30, or transmits data received from the mobile terminal 30 (i.e., server-bound data or upstream-bound data) to one of the first to third service servers 11 to 13.

The first storage 220 stores: (a) network attribute information and user data received from the mobile terminal 30, (b) path priorities and service priorities determined by the priority determiner 230, and (c) virtual IPs assigned to services by the virtual IP assignor 240. The network attribute information and the user data will be described in detail later with reference to FIG. 3.

When the path priorities and the service priorities are provided by the service controller (not shown) or the client 31, the first storage 220 may temporarily store the provided path priorities and service priorities.

The priority determiner 230 may analyze the network attributes and the user data stored in the first storage, and thereby determine the path priorities of actual IPs. The priority determiner 230 may determine path priorities using a variety of well-known methods such as a traditional method, a function based method, a user-centric method, a Fuzzy logic-based method, a neural network-based method, a multiple attribute method, and/or a context-aware method. The fact that the path priority of a specific actual IP is high may mean that the categories shown in Table 1, such as network cost, speed and stability, are superior to those of a device having another actual IP.

Also, the priority determiner 230 may determine the priorities of services (referred to as "service priorities" below) that the mobile terminal 30 is provided with. The service priorities are the relative priorities of the services that the mobile terminal 30 is provided with, and may vary according to the degree of importance of the services. The fact that the service priority of a specific service is high connotes that the service requires a higher quality of service (QoS) than other services.

The priority determiner 230, in assigning service priorities to the services, may assign as many different service priorities as there are services. The priority determiner 230 may, alternatively, assign a fewer number of service priorities, to the services. For example, as shown in FIG. 4, when the number of services is three, the priority determiner 230 may assign two service priorities of high (H) and one service priority of low (L) to the different respective services.

The path priorities may be determined by the mobile terminal, and the service priorities may be determined by the server controller (not shown) or the mobile terminal 30. In this case, the path control apparatus 20 may not include the priority determiner 230.

Alternatively, the path priorities and the service priorities may be determined through negotiation between the server controller (not shown) and the mobile terminal 30. In this case, the server controller (not shown) and the mobile terminal 30 may share information that one of the first to third service servers 11 to 13 has (e.g., a part of network attribute information shown in FIG. 3) and information that the mobile terminal 30 has (e.g., user data of FIG. 3), and may determine the path priorities or the service priorities through negotiation based on the shared information, or through a requested setting of the priorities.

When the path priorities are determined by the mobile terminal 30, the communicator 210 receives information on the path priorities determined according to respective actual IPs by the mobile terminal 30, and the second storage 260 may store a table in which the received actual IP-specific path priorities are recorded. In this situation, the communicator 210 does not need to collect network attributes or user data, and the table builder 250 does not need to build a network management table 300 such as the one shown in FIG. 3.

When the service priorities are determined by the server controller (not shown), the server controller (not shown) may determine the service priorities of all of the services provided by the first to third service servers 11 to 13. When the service priorities are determined by the mobile terminal 30, the mobile terminal 30 may determine the service priorities of all services provided through a plurality of path control apparatuses. Also, when the service priorities are determined by the priority determiner 230, the priority determiner 230 may determine the priorities of all services involving the path control apparatus 20. An example in which the priority determiner 230 determines the path priorities and the service priorities will be described below.

The virtual IP assignor 240 assigns virtual IPs to actual IPs, with reference to the service priorities determined for the services. The virtual IP assignor 240 generates as many virtual IPs as there are different service priorities determined for the services. The virtual IPs may be assigned to the services, to the service priorities, or to the actual IPs. At this time, the virtual IP assignor 240 may assign the same virtual IP to services having the same service priority. Also, the virtual IP assignor 240 may assign at least one virtual IP to at least one actual IP.

For example, as shown in FIG. 4, to be described in more detail later, it is assumed that there are three services and two determined service priorities (H and L), which are assigned in this example by the virtual IP assignor 240 to the services. In an alternative example, when there are three services and four different determined service priorities, the virtual IP assignor 240 in this situation may assign only some of the four service priorities to the services. The virtual IP assignor 240 may map the virtual IPs, that it assigned to the services, to the identifications (IDs) of the services (see the "SERVICE ID" column in FIG. 4) and may further store the virtual IPs and the IDs in the first storage 220 (shown in FIG. 2).

When the service priorities determined for the services change, the virtual IP assignor 240 may change the virtual IPs assigned to the services, with reference to the changed service priorities. For example, assume that two services S1 and S2 currently have a service priority of H, and one service S3 currently has a service priority of L. After a while, when the service priority of the service S1 is changed to L, the virtual IP assignor 240 may change the virtual IP of the service S1 to the same virtual IP as that of the service S3.

Meanwhile, the table builder 250 may build a network management table 300, a service management table 400, and a path mapping table 500 (see FIGS. 3, 4, and 5). It will be understood that, here, the term "table" is used for the sake of linguistic convenience; the actual implementation of an exemplary embodiment need not use an actual table but may implement, instead, any structure that implements the relationships connoted by the tables described herein.

First the network management table 300 will be described.

The table builder 250 may build the network management table 300 using the network attributes, the user data, and the path priorities determined for the actual IPs stored in the first storage 220.

FIG. 3 shows an example of a network management table 300 built by the table builder 250.

Referring to FIG. 3, the network management table 300 includes the following categories of information (depicted as tabular columns, for the sake of illustration): mobile node ID, actual IP, network attribute, user data, and path priority. The particular categories shown in FIG. 3 may be expanded in number or reduced, depending, e.g., on the server systems involved.

The table builder 250 records the ID of the client 31 or the ID of the mobile terminal 30 in the category of mobile node ID, and records actual IPs that the mobile terminal 30 or the client 31 can use in a heterogeneous network environment in the actual IP column. A mobile node ID may relate to the client 31 or the mobile terminal 30. For this particular discussion, it is assumed that the mobile terminal 30 is the entity in FIG. 3 to which the Mobile Node ID column relates.

The table builder 250 records network attributes showing collective information on actual IPs that can be used for the mobile terminal 30 to transmit and receive data. Since the table builder 250 records information set by a user of the mobile terminal 30 in the category of user data, user data may be recorded, in accordance with a user preference.

The Table 1, shown below, helps explain the meaning of the different columns within the Network Attribute Information section of the table illustrated in FIG. 3.

TABLE 1

| Classification | | Description |
|---|---|---|
| Network attribute | Net TYPE | Wireless network type |
| | Bandwidth | Bandwidth (or transmission rate) of path |
| | SNR(BER) | Signal-to-noise ratio |
| | Cost(unit) | Network cost required for transmission of specific data unit |
| | Congestion rate | Occurrence rate of network congestion |
| | Handover rate | Occurrence rate of vertical and horizontal handovers |
| | Reliability | Success rate of transport layer transmission |

TABLE 1-continued

| Classification | | Description |
|---|---|---|
| User data | Allowed | Whether or not user has allowed (i.e., has approved that user data be sent over) a wireless network |
| | Preference | User preference |
| | Rate plan | Type of user's rate policy |
| | Priority | Priority of path |

Every time that network attribute information or user data information (as illustrated in FIG. 3) is received from the mobile terminal 30, the priority determiner 230 checks it to determine the path priority of each IP. And, every time a change in path priorities is detected by the priority determiner 230, the table builder 250 updates the network management table 300 accordingly.

Next, the service management table 400 will be described. The table builder 250 may build the service management table 400 using the service priorities determined for the services and the virtual IPs assigned to the services. The service management table 400 shows collective information provided to the mobile terminal 30, and the service-specific service priorities may be stored in the first storage 220.

FIG. 4 shows an example of the service management table 400 built by the table builder 250. Referring to FIG. 4, the service management table 400 includes the following columns, or categories of information: mobile node ID, service ID, service priority, and virtual IP.

The table builder 250 records the ID of the mobile terminal 30 under the mobile node ID category, and the IDs of the services provided to the mobile terminal 30 under the service ID category.

Also, the table builder 250 records in the category of service priority the service priorities in accordance with the degree of importance of the services, and the assigned virtual IPs in the virtual IP category. As already mentioned with respect to the virtual IP assignor 240, when the service priorities determined for the services change, the virtual IP assignor 240 changes the virtual IPs assigned to the services with reference to the changed service priorities. Thus, the table builder 250 updates the service management table 400 every time the virtual IPs of the services are changed.

Finally, the path mapping table 500 will be described. The table builder 250 may build the path mapping table 500 by mapping the actual IPs and the virtual IPs to each other, in association with the service priorities and the server IPs assigned to the first to third service servers 11 to 13 that provide the services.

FIG. 5 shows an example of such a path mapping table 500 built by the table builder 250.

Referring to FIG. 5, the path mapping table 500 includes the following categories (illustrated as columns, for the sake of simplifying the explanation): service priority, virtual IP, actual IP, and server IP.

The table builder 250 records the service priorities mapped to the services in FIG. 4 in the service priority category, and the virtual IPs mapped to the service priorities in FIG. 4 in the virtual IP category. Also, the table builder 250 records the actual IPs available to the mobile terminal 30 in the actual IP category, and the IPs of servers that provide the respective services in the server IP category.

Specifically, the table builder 250 may build the path mapping table 500 by mapping an actual IP, having a high path priority, and a server IP, to a virtual IP which is mapped to a high service priority among the virtual IPs of FIG. 4. This is intended to make it so that the service that has the higher relative priority is connected with the actual IP that has the higher path priority. As can be seen in FIG. 5, the IP of the mapped service server is the IP of the server that provides the service of the high service priority in FIG. 4.

The network management table 300, the service management table 400, and the path mapping table 500, all of which are built by the table builder 250, may be stored in the second storage 260. When an actual IP available to the mobile terminal 30 is added or removed, the table builder 250 may accordingly update the network management table 300 and the path mapping table 500.

For example, when the mobile terminal 30 moves and enters a new network environment, a new actual IP is given to the mobile terminal 30 by a RAN of the new network environment. The mobile terminal 30 requests registration of the new actual IP while transmitting network attributes of the new actual IP, and user data information, to the path control apparatus 20. Then, the priority determiner 230 re-determines the path priorities of the added new actual IP and existing actual IPs, and the table builder 250 may update the network management table 300 and the path mapping table 500 with reference to the path priorities.

Also, when the connection of a previously used network environment is released (due, e.g., to movement of the mobile terminal 30), the mobile terminal 30 requests the path control apparatus 20 to deregister the actual IP that was previously in use. Then, the priority determiner 230 re-determines the path priorities of the actual IPs, now without the just-released actual IP, and the table builder 250 may likewise update the network management table 300 and the path mapping table 500 with reference to the re-determined path priorities.

Meanwhile, the controller 270 may cause a service, having a higher relative priority among the services, to be provided through an actual IP having a higher relative path priority, among the other actual IPs. In other words, the controller 270 may control the table builder 250 to build the path mapping table 500 appropriately for such a demand.

Also, the controller 270 may control a path, between at least one of the servers 11 to 13 and the mobile terminal 30, using the thus-built path mapping table 500. A description will now be provided using the first service server 11 as an example of the first to third service servers 11 to 13.

First described will be a case in which data is transmitted from the mobile terminal 30 to the first service server 11. When data from the mobile terminal 30 is received at the path control apparatus 20 (i.e., server-bound data), the controller 270 checks the source and destination IP addresses; in this example, the received data includes the first source IP address of 10.1.1.10 and the first destination IP address of 1.1.1.11. The first source IP is an actual IP that the mobile terminal 30 has utilized for data transmission, and the first destination IP is the server IP of the first service server 11 from which mobile terminal 30 wants to receive a service. Using the path mapping table 500, the controller 270 may replace the first source IP (10.1.1.10), that is, the actual IP, with a virtual IP (100.1.1.1) mapped to the actual IP (see line 1 of the path mapping table 500). Then, using the replaced virtual IP as the first source IP, the controller 270 may control the communicator 210 to transmit the data that was received from the mobile terminal 30 onward to the first service server 11 in a manner that indicates that the source and destination IP addresses are the virtual IP address (100.1.1.1) and the server IP address (1.1.1.11), respectively. In this way, the first service server 11 receives modified server-bound data that makes it appear that the source (i.e., mobile terminal 30) has a source IP address that is the virtual IP (namely, 100.1.1.1) that is mapped in the path mapping table to the actual IP (namely, 10.1.1.10), rather than the actual IP of the mobile terminal 30 (i.e., the first source IP). In response, for the sake of providing the requested service, the server 11 transmits data now responds by sending out terminal-bound data having source and destination addresses that correspond to the server's own IP address (i.e., 1.1.1.11) and the mobile terminal's virtual IP address (i.e., 100.1.1.1), respectively. Another way to put this is to say that the server sends data to the mobile terminal 30 using the received virtual IP as a source IP address.

Referring to FIG. 5, when data is received from the mobile terminal 30 using an actual IP (i.e., the first source IP) "10.1.1.10," the controller 270 checks a virtual IP mapped to "10.1.1.10" in the path mapping table 500. Since the checked virtual IP is "100.1.1.1," the controller replaces the actual IP "10.1.1.10" with the virtual IP "100.1.1.1."

In this way, the first service server 11 receives the data via the path control apparatus 20 such that the first source IP is "100.1.1.1", and determines that the data is received from the mobile terminal 30 using "100.1.1.1" as an IP. For service provision, the first service server 11 transmits data to the mobile terminal 30 using "100.1.1.1" as a destination IP.

Next, a case in which data is transmitted from the first service server 11 to the mobile terminal 30 will be described.

When data is received from the first service server 11 through a virtual IP (i.e., terminal-bound data, or client-bound data), the controller 270 checks a first source IP and a first destination IP included in the received data. The first source IP is a server IP that the first service server 11 utilizes to transmit data of a service to the mobile terminal 30. The first destination IP is a virtual IP of the mobile terminal 30 that will receive the data of the service, and may be the same as the first source IP address that was included in the data when some data has been previously received from the mobile terminal 30 (i.e., the virtual IP address created for that particular service, for use with that particular mobile terminal 30). Thus, the terminal-bound data sent from the server is modified so as to produce modified terminal-bound data, which is provided to the mobile terminal 30.

The controller 270 checks the tables 400 or 500, and recognizes that the destination IP included in the data received from the first service server 11 is a virtual IP that it has assigned. The controller 270 identifies the corresponding actual IP (10.1.1.10) mapped to this destination IP (i.e., 100.1.1.1, the virtual IP) in the path mapping table 500, and restores (or replaces) the virtual IP with the mapped actual IP. Then, the controller 270 controls the communicator 210 to transmit the data to the mobile terminal 30 using the restored actual IP as the destination IP. As may be recalled to mind by referring to FIG. 1, this restored data will travel over the first RAN 51 to the mobile terminal 30. In this way, the communicator 210 may transmit to the mobile terminal 30 the data of which the source IP is the server IP of the first service server 11, and the destination IP is the actual IP of the mobile terminal 30. When there is no change in the network environment of the mobile terminal 30, a source IP used for the mobile terminal 30 to transmit data to the first service server 11 may be the same as a destination IP used to transmit data to the mobile terminal 30.

In other words, when a mobile terminal sends data to a server, the path control apparatus 20 replaces the source IP address with a mobile terminal virtual IP address that has a correspondence to a given service priority. Likewise, when a server sends data to a mobile terminal, the path control apparatus 20 replaces the destination IP address, which is a virtual IP address that has a correspondence to a given service priority, with an actual destination IP address of the mobile terminal. Another way to put this is to say that the mobile terminal sends data with a first source IP address, and the path control apparatus changes the first source IP address to a second source IP address, whereas the server sends data with a first destination IP address, and the path control apparatus changes the first destination IP address to a second destination IP address. More generally, the path control apparatus virtualizes the address of the mobile terminal/client, as seen by a plurality of servers, in accordance with a plurality of service priorities. Even more generally, the path control apparatus, which stores the addresses of one or more upstream devices (e.g., servers), and which receives an indication of one or more actual addresses of a downstream device (e.g., a mobile terminal), virtualizes the addresses of the downstream device, with respect to the one or more actual addresses of the downstream devices, in accordance with one or more service priorities.

To elaborate, again referring to FIG. 5, suppose that data is received at the path control apparatus 20 from the first service server 11. The data has a destination IP address that matches the virtual IP address of "100.1.1.2" (i.e., second destination IP). When this data is received, the controller 270 determines what actual IP is mapped to "100.1.1.2" in the path mapping table 500. The controller 270 determines that the corresponding actual IP is "20.1.1.20." The controller 270 restores the virtual IP of "100.1.1.2" to the actual IP of "20.1.1.20" and sends the restored data to the mobile terminal 30 through the second RAN 52 (see FIG. 1).

In this way, the mobile terminal 30 receives the data through a second destination IP of "20.1.1.20." Meanwhile, the controller 270 may utilize the path mapping table 500 for data multi-homing, or for a seamless vertical handover.

First, multi-homing will be described.

When data received at the path control apparatus 20 from the first service server 11 has a destination IP that matches a virtual IP, the controller 270 identifies a corresponding (i.e., mapped) actual IP using the path mapping table 500. When it is detected that a plurality of actual IPs are mapped to the received virtual IP address, the controller 270 may use the plurality of actual IPs as destinations for the data. The controller then 270 controls the communicator 210 to transmit the data to the mobile terminal 30 using the plurality of actual IPs. In this way, the path control apparatus 20 provides a multi-homing service, thereby supporting Always Best Connection (ABC) in which the communications capability of a plurality of networks available to the mobile terminal are maximized.

Next, a seamless vertical handover will be described.

When the mobile terminal 30 notifies the path control apparatus 20 of the connection release of an actual IP, in the midst of a transmission of data between the two, the table builder 250 updates the network management table 300 and the path mapping table 500. For example, when the connection of an actual IP of "10.1.1.10" is released, the table builder 250 may change the actual IP mapped to a virtual IP "100.1.1.1" in FIG. 5 with another actual IP "20.1.1.20." The controller 270 changes a destination IP for data transmission from "10.1.1.10" to "20.1.1.20" using the updated path mapping table 500. Then, the controller 270 controls the communicator 210 to transmit the data to the mobile terminal 30 using the changed actual IP "20.1.1.20." In other words, even when the mobile terminal 30 moves to another network and thus releases the connection of an actual IP which may have been in use at the time of release, and uses another actual IP, the first service server 11 can continuously provide a service without knowing the other actual IP because the virtual IP known by the server remains unchanged.

Figure 6:
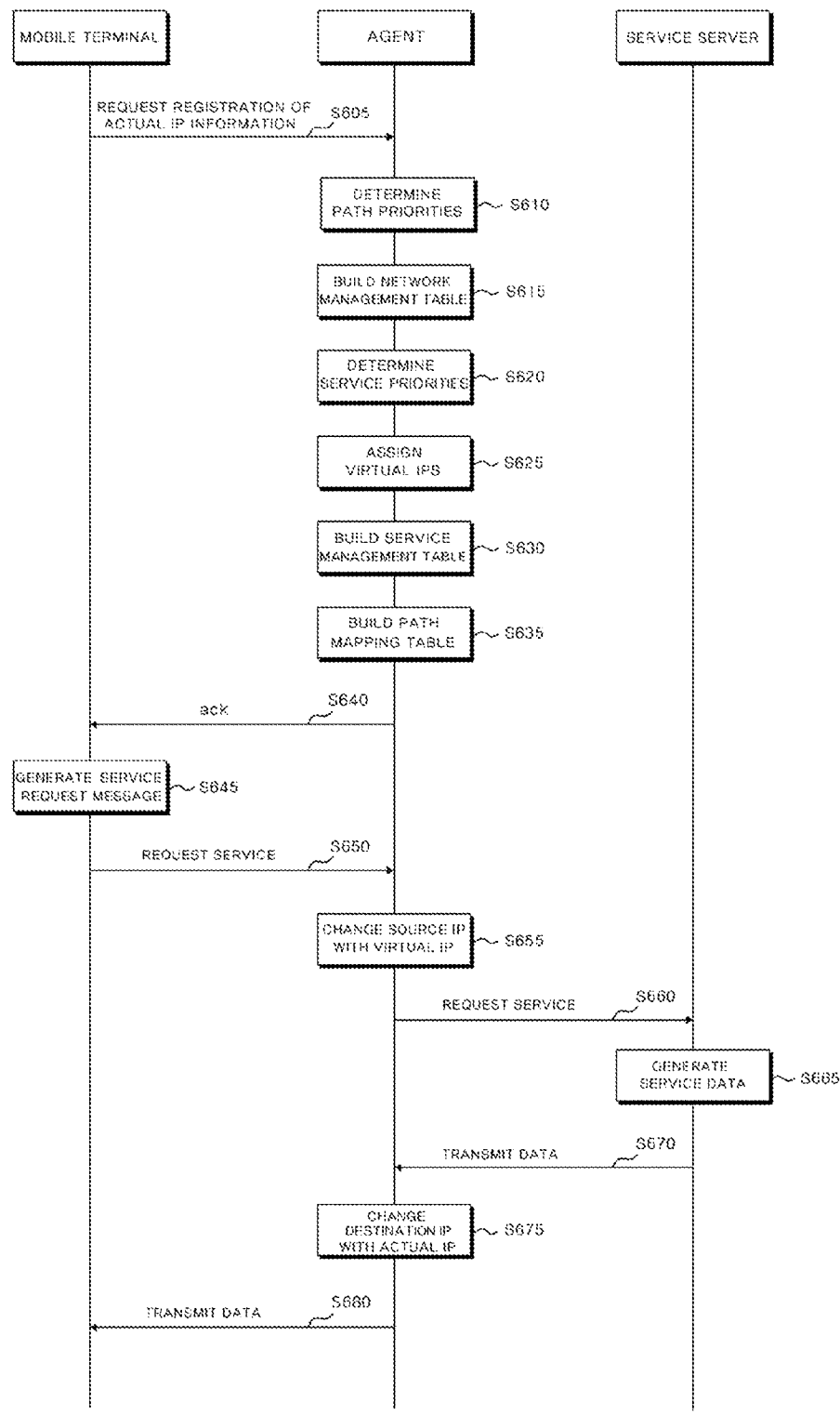
FIG. 6 is a flowchart illustrating a method for an agent to control a data transmission/reception path according to an exemplary embodiment.
Figure 7:
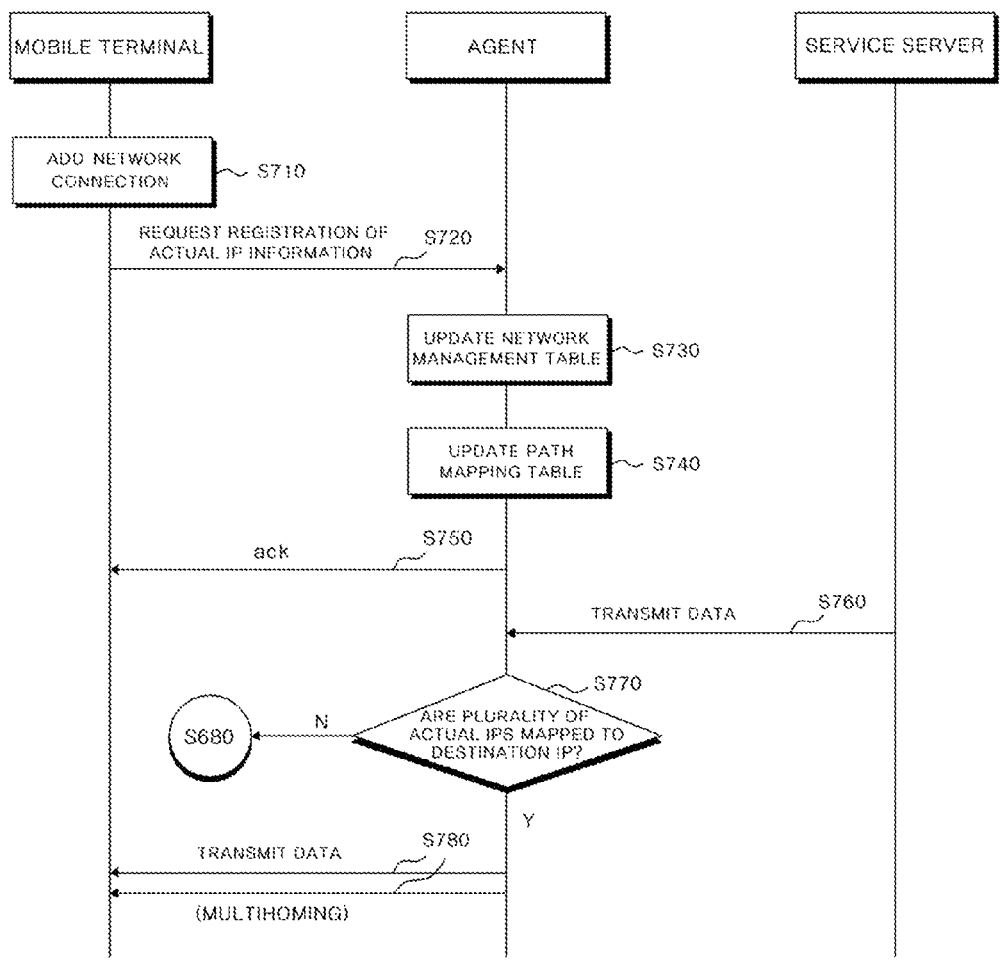
FIG. 7 is a flowchart illustrating a method for an agent to support multi-homing according to an exemplary embodiment.
Figure 8:
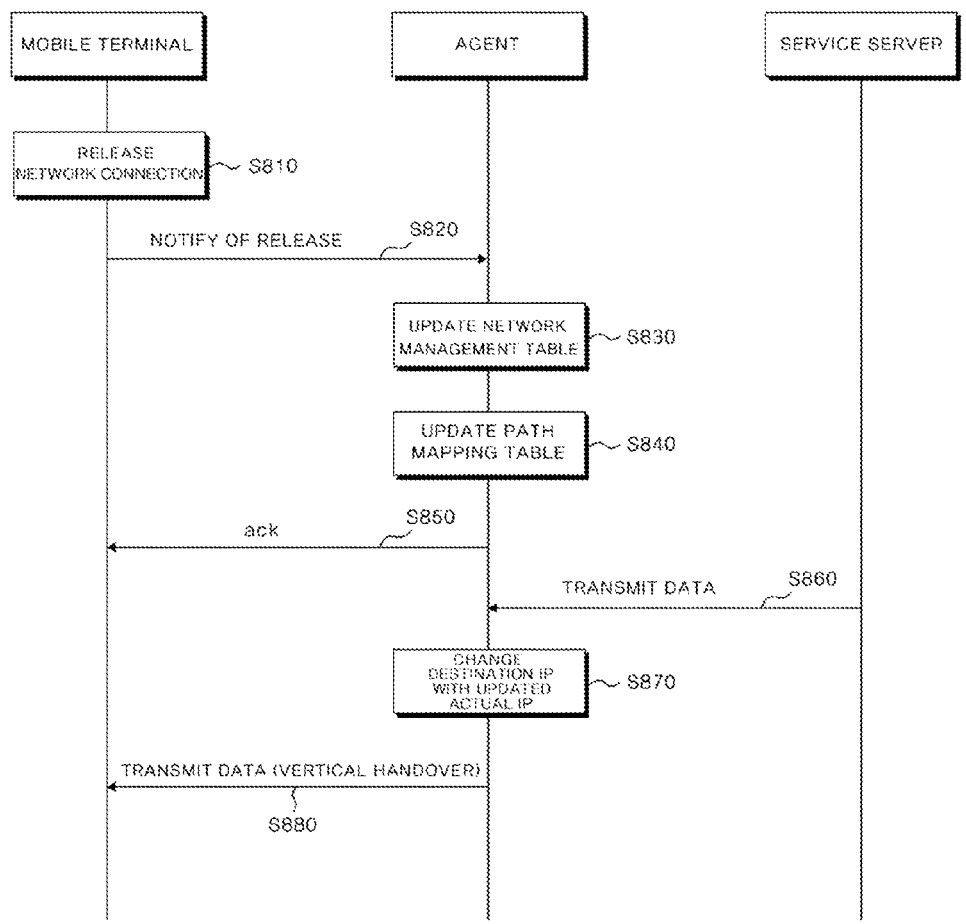
FIG. 8 is a flowchart illustrating a method for an agent to support a seamless vertical handover according to an exemplary embodiment.

A method for an agent to control a data transmission/reception path according to an exemplary embodiment will be described below with reference to FIGS. 6 to 8. In FIGS. 6 to 8, a mobile terminal, an agent and a service server may be the mobile terminal 30, the path control apparatus 20 and the first service server 11 of FIG. 1, respectively.

FIG. 6 is a flowchart illustrating a method for an agent to control a data transmission/reception path according to an exemplary embodiment.

Referring to FIG. 6, a mobile terminal requests an agent to register information on actual IPs available in a heterogeneous network environment (S605). The mobile terminal may request the registration of the actual IPs while transmitting network attribute information on the respective actual IPs and user data to the agent. When path priorities are determined (by, e.g., a service server or the mobile terminal), the mobile terminal may provide the path priorities of the respective actual IPs to the agent in step 605.

The agent sets the path priorities from the received network attribute information about the actual IPs and from the received user data (S610). In step 610, the agent may give a high path priority to an actual IP that is highly preferred by users, has relatively high safety for data transmission/reception, is inexpensive, shows a high transmission rate, and/or has high security.

The agent may build and store a network management table as shown in FIG. 3 using the network attribute information on the actual IPs, the user data and the path priorities determined in step 610 (S615). The agent builds network management tables according to mobile terminals.

Also, the agent may determine the service priorities of services provided to the mobile terminal in consideration of quality of service requirements, or QoS (S620). When the service priorities are determined by the mobile terminal or the service server, service-specific service priorities may be received from the mobile terminal or the service server in step 620.

The agent may assign virtual IPs to the respective services with reference to the service priorities (S625). In step 625, the agent may generate as many virtual IPs as the number of the service priorities and assign the generated virtual IPs to the respective services with reference to the service priorities.

The agent may build and store a service management table as shown in FIG. 4 using the service priorities of the services determined in step 620 and using the virtual IPs assigned in step 625 (S630).

The agent may build and store a path mapping table as shown in FIG. 5 using the network management table and the service management table built in steps 615 and 630 (S635). The agent may build the path mapping table by mapping, to each other, the actual IPs registered in the network management table, the virtual IPs assigned to the services (or actual IPs receiving the services) recorded in the service management table and server IPs of the service server. By mapping an actual IP having a high path priority and an IP of the service server to a virtual IP mapped to a high service priority among the virtual IPs, the agent may build the path mapping table.

When step 635 is finished, the agent transmits an ACK to the mobile terminal, thereby notifying the mobile terminal that the registration of the actual IPs has been accomplished (S640). The mobile terminal generates a service request message so as to receive a service from the service server (S645), and may request the service by transmitting the generated service request message, which is received at the agent (S650). In the service request message transmitted in step 650, an actual IP used by the mobile terminal and an IP of the service server are recorded as a source IP and a destination IP, respectively.

The agent checks the source IP of the received service request message, finds the corresponding virtual source IP, that is, a virtual IP mapped to the actual IP, in the path mapping table, and changes the source IP with the thus-identified virtual IP (S655).

The agent forwards the request for service by transmitting the service request message, in which the actual source IP has been exchanged with the virtual IP in step 655, to the service server (S660).

The service server checks the source IP of the received service request message, and generates data of the service requested by the mobile terminal (S665).

The service server transmits the generated data, which is received by the agent (S670). The data transmitted from the service server has a server IP as a source IP and the virtual IP previously identified in step 665 as a destination IP. In other words, the service server recognizes the source IP checked in step 665 as the IP of the mobile terminal, and generates the data to be sent to the mobile terminal.

The agent identifies the destination IP of the data received from the service server, finds in the path mapping table the corresponding actual IP that was previously mapped to the destination IP, and changes the destination IP with the checked actual IP (S675). This is possible because the agent has previously set the mapping, and because the virtual destination IP of the data received from the service server is a virtual IP that resolves to the agent. The agent transmits the data, of which the destination IP has been changed with the actual IP in step 675, to the mobile terminal (S680). In this way, the service requested by the mobile terminal is transmitted and received using a virtual IP.

FIG. 7 is a flowchart illustrating a method for an agent to support multi-homing according to an exemplary embodiment.

Referring to FIG. 7, when a new network connection is added (S710), the mobile terminal is assigned a new actual IP from a RAN of a new network environment.

While transmitting network attribute information and user data to the agent, the mobile terminal requests the agent to register information on the new actual IP (S720).

The agent reevaluates the path priorities using the received network attribute information of the new actual IP and the received user data, and updates the network management table built in step 615 (S730).

Using actual IPs of the updated network management table, the agent updates the path mapping table built in step 635 (S740).

When step 740 is finished, the agent notifies the mobile terminal that the registration of the new actual IP has been finished by transmitting an ACK to the mobile terminal (S750).

When data of the service provided in FIG. 6 is received from the service server through a destination IP (i.e., virtual IP) (S760), the agent checks in the path mapping table (S770) to see whether a plurality of actual IPs are mapped to the destination virtual IP.

When the agent detects that a plurality of actual IPs are mapped to the destination IP (S770-Y), a multi-homing service of transmitting data to the mobile terminal using the plurality of actual IPs may be provided (S780). In step 780, the agent provides the multi-homing service by substituting the plurality of actual IPs found in step 770 in place of the received destination virtual IP of the data.

FIG. 8 is a flowchart illustrating a method for an agent to support a seamless vertical handover according to an exemplary embodiment.

Referring to FIG. 8, when a connection with a network relating to an actual IP is released while the mobile terminal is in the midst of receiving data of a service using the actual IP (S810), the mobile terminal notifies the agent that the connection of the actual IP has been released (S820). In FIG. 8, the released actual IP is referred to as the "released IP" for the sake of convenience.

By removing the released IP from the actual IPs recorded in the network management table, in response to the notification from the mobile terminal, the agent updates the network management table built in step 615 (S830).

Using the actual IPs remaining in the updated network management table, the agent updates the path mapping table built in step 635 (S840). In other words, when a previously used IP, which is mapped to a virtual IP in the path mapping table, is released, the agent may remove the released IP and substitute a different actual IP address for the released one.

When step 840 is finished, the agent notifies the mobile terminal that the released IP has been removed by transmitting an ACK to the mobile terminal (S850).

When the data of the service provided in FIG. 6 is received, from the service server using a destination IP (i.e., virtual IP) (S860), the agent changes the destination IP with the substituted actual IP which now maps to the destination IP (S870).

Using the actual IP changed in step 870, the agent transmits the data to the mobile terminal (S880). In this way, the agent may support a seamless vertical handover using the virtual IP mapped to the destination IP provided from the agent server.

The above-described exemplary embodiments can be used in various fields as follows.

1. When the exemplary embodiments are applied to a server system that provides a service to a mobile node, the exemplary embodiments can be used in the system integration (SI) business, such as server tuning, and the design and implementation of a new server system, which changes the server system to be able to support vertical handover and multi-homing operations. In particular, the exemplary embodiments can be applied to a server system providing a streaming service such as a mobile voice over IP (mVoIP) service.

2. In addition to point 1 just described, the exemplary embodiments can be used in the SI business, such as server tuning, and design and implementation of a new server system, which can improve the relative safety of a high-priority service by separately supporting service-specific priorities, or can reduce the network cost of a mobile node through the analysis, determination and selection processes of a multi-homing environment.

3. Also, the function of an agent in which the algorithms of the above-described exemplary embodiments are defined may be implemented in the form of software and may thereby installed in a router and/or a switch, in a non-transitory computer readable medium, so that the exemplary embodiments can be used in network equipment.

4. Further, when the above-described exemplary embodiments are applied to a place in which servers are integrated, such as a data center, it is possible to improve the value of an outsourced service provided to a customer, and strengthen the competitiveness of existing business.

Thus, in one or more exemplary embodiments, the continuity of a service may be ensured regardless of the mobility of a mobile node, thereby supporting a seamless vertical handover. In other words, by providing a service using a virtual IP, it is possible to provide a short delay time, service continuity and connection continuity even when a network connection or IP is changed by movement of a mobile node.

Also, in one or more exemplary embodiments, a service can be provided by simultaneously using a plurality of actual network paths available to a mobile node, making it possible to achieve the effects and benefits of an ABC environment, including swift service, low network cost, etc., by rapidly determining available resources with reference to a path mapping table.

In one or more exemplary embodiments, there is no need to additionally construct the infrastructure of an existing network system or modify the software of a server system, and no need to modify the kernel of a mobile node, and thus it is easy the technology to proliferate.

One or more exemplary embodiments utilize a virtual network path, so that a single service provider can independently support a vertical handover without the entire infrastructure such as a service server, an agent and a RAN.

Since an exemplary embodiment can support a seamless vertical handover, even when there is no tunneling element between a mobile IP and nodes used for an existing vertical handover, there is no additional network load or cost incurred for the vertical handover.

In an exemplary embodiment, a superior path is assigned to high QoS, so that a service requiring high QoS can be relatively stably provided to a mobile node.

It will be apparent to those skilled in the art that various modifications can be made to the above-described exemplary embodiments without departing from the spirit or scope of the inventive concept. Thus, it is intended that the inventive concept be interpreted in accordance with the appended claims and their equivalents.

What is claimed is:

1. A method of controlling a data transmission/reception path between a server and a mobile terminal in a heterogeneous network environment, the method comprising:
   mapping at least one actual Internet protocol (IP) address of the mobile terminal and at least one IP address of the server in the heterogeneous network environment to at least one virtual IP address in association with service priorities assigned to services that are provided to the mobile terminal by the server;
   generating a path mapping table storing the mapping of the actual IP address, the IP address of the server, the virtual IP address and the service priorities; and
   determining a data transmission/reception path, between the server and the mobile terminal, with reference to the generated path mapping table.

2. The method of claim 1, wherein the at least one virtual IP address is assigned based on the services provided to the mobile terminal by the server.

3. The method of claim 2, wherein the at least one virtual IP address is assigned based on the service priorities assigned to the services.

4. The method of claim 3, further comprising:
   when at least one of the service priorities assigned to the services is changed, updating in the path mapping table the at least one virtual IP address.

5. The method of claim 3, wherein the determining of the data transmission/reception path includes determining the data transmission/reception path so that, when the actual IP address has a relatively higher respective path priority, the actual IP address is assigned to one of the services also having a relatively higher respective one of the service priorities.

6. The method of claim 1, wherein the determining the data transmission/reception path comprises:
   replacing a received actual IP address, included in data transmitted from the mobile terminal to the server, with a substituted virtual IP address mapped to the actual IP address in the path mapping table, to provide modified server-bound data, and then
   transmitting the modified server-bound data to the server.

7. The method of claim 1, wherein the determining of the data transmission/reception path comprises:
   replacing a received virtual IP address, included in data transmitted from the server to the mobile terminal, with a substituted actual IP address mapped to the virtual IP address in the path mapping table, to provide modified terminal-bound data, and then
   transmitting the modified terminal-bound data to the mobile terminal.

8. The method of claim 7, wherein the determining the data transmission/reception path further comprises responding to an indication that the actual IP address is released by modifying the path mapping table to substitute another actual IP address of the mobile terminal for the released actual IP address.

9. The method of claim 1, wherein, when a plurality of actual IP addresses are mapped to the virtual IP address, modifying terminal-bound data by replacing the virtual IP address with the plurality of actual IP addresses to provide modified terminal-bound data, thereby multi-homing the terminal-bound data to the mobile terminal.

10. An apparatus for controlling a data transmission/reception path between a server and a mobile terminal in a heterogeneous network environment, the apparatus comprising:
    a table builder which builds a path mapping table by mapping at least one actual Internet protocol (IP) address of the mobile terminal and at least one IP address of the server in the heterogeneous network environment to at least one virtual IP address in association with service priorities assigned to services that are provided to the mobile terminal by the server; and
    a controller configured to determine a data transmission/reception path, between the server and the mobile terminal, with reference to the built path mapping table.

11. The apparatus of claim 10, wherein the at least one virtual IP address is assigned based on the services provided to the mobile terminal by the server.

12. The apparatus of claim 11, further comprising a virtual IP address assignor which assigns the at least one virtual IP address in based on the service priorities assigned to the services.

13. The apparatus of claim 12, wherein, when at least one of the service priorities assigned to the services are changed, the virtual IP address assignor updates the at least one virtual IP address.

14. The apparatus of claim 12, wherein the controller determines the data transmission/reception path so that, when the actual IP address has a relatively higher respective path priority, the actual IP address is assigned to one of the services also having a relatively higher respective one of the service priorities.

15. The apparatus of claim 10, wherein the controller:
    replaces a received actual IP address, included in data transmitted from the mobile terminal to the server, with a substituted virtual IP address mapped to the actual IP address in the path mapping table, to provide modified server-bound data, and then
    transmits the modified server-bound data to the server.

16. The apparatus of claim 10, wherein the controller:
    replaces a received virtual IP address, included in data transmitted from the server to the mobile terminal, with a substituted actual IP address mapped to the virtual IP address in the path mapping table, to provide modified terminal-bound data, and then transmits the modified terminal-bound data to the mobile terminal.

17. The apparatus of claim 16, wherein the controller responds to an indication, that the actual IP address is released, by modifying the path mapping table to substitute another actual IP address of the mobile terminal for the released IP address.

18. The apparatus of claim 10, wherein, when a plurality of actual IP addresses are mapped to the virtual IP address, the controller modifies terminal-bound data by replacing the virtual IP address with the plurality of actual IP addresses to provide modified terminal-bound data, thereby multi-homing the terminal-bound data to the mobile terminal.

19. A hardware device, comprising:
a processing circuit and a non-transitory memory storing instructions that enable the processing circuit to perform operations comprising:
storing an address of an upstream device;
storing actual addresses of a downstream device; and
virtualizing the downstream device actual addresses, with respect to the upstream device address, in accordance with associated service priorities assigned to services that are provided to the downstream device by the upstream device,
wherein each of the downstream device actual addresses and the upstream device address are mapped to a virtual address of the downstream device in a path mapping table in accordance with the service priorities.

20. The hardware device as set forth in claim 19, wherein the virtualizing is effected with reference to the path mapping table.

21. The hardware device as set forth in claim 20, wherein the operations further comprise:
modifying received upstream-bound data by replacing a source address, in the upstream-bound data, with one of the downstream device virtual addresses indicated in the path mapping table as corresponding to the source address; and
modifying received downstream-bound data by replacing a destination address, in the downstream-bound data, with one of the downstream device actual addresses indicated in the path mapping table as corresponding to the destination address.

22. The hardware device as set forth in claim 21, wherein, when the path mapping table indicates that more than one of the downstream device actual addresses correspond to the destination address, the downstream-bound data is modified by replacing the destination address with all of the corresponding more than one downstream device actual addresses.

23. The hardware device as set forth in claim 20, wherein the operations further comprise responding, to a notification of a release of one of the downstream device actual addresses, by automatically replacing, in the path mapping table, the released one of the downstream device actual addresses with another one of the downstream device actual addresses.

* * * * *